United States Patent
Wang et al.

(10) Patent No.: US 11,510,273 B2
(45) Date of Patent: Nov. 22, 2022

(54) ENHANCED RADIO-RESOURCE CONTROL (RRC) IDLE MODE

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/273,201

(22) PCT Filed: Sep. 6, 2019

(86) PCT No.: PCT/US2019/050084
§ 371 (c)(1),
(2) Date: Mar. 3, 2021

(87) PCT Pub. No.: WO2020/051547
PCT Pub. Date: Mar. 21, 2020

(65) Prior Publication Data
US 2021/0204354 A1  Jul. 1, 2021

Related U.S. Application Data

(60) Provisional application No. 62/728,575, filed on Sep. 7, 2018.

(51) Int. Cl.
*H04W 76/27* (2018.01)
*H04W 4/14* (2009.01)
(Continued)

(52) U.S. Cl.
CPC .......... *H04W 76/27* (2018.02); *H04L 1/1896* (2013.01); *H04W 4/14* (2013.01); *H04W 68/005* (2013.01);
(Continued)

(58) Field of Classification Search
CPC ..... H04W 76/27; H04W 4/14; H04W 68/005; H04W 76/11; H04W 76/28; H04W 92/10; H04L 1/1896
(Continued)

(56) References Cited

U.S. PATENT DOCUMENTS

| 8,005,127 B2 | 8/2011 | Whinnett |
| 9,756,564 B2 | 9/2017 | Stojanovski et al. |

(Continued)

FOREIGN PATENT DOCUMENTS

| CN | 1040932 C | * 11/1998 | ........... H04L 1/0053 |
| KR | 100474889 B1 | * 3/2005 | ........... G06F 3/0841 |

(Continued)

OTHER PUBLICATIONS

"3GPP TR 23.720 V13.0.0", 3GPP R 23.720 V13.0.0, Mar. 2016, Mar. 2016, 97 pages.

(Continued)

*Primary Examiner* — Inder P Mehra
(74) *Attorney, Agent, or Firm* — Colby Nipper PLLC

(57) ABSTRACT

The present disclosure describes techniques and systems for wireless communications between a base station [120] and a user equipment [110] using an enhanced radio-resource control idle mode. The described techniques and systems enable a user equipment [110] to receive a radio-resource control release message [410] that includes a cell radio-network temporary-identifier and, in response, enter [415] the enhanced radio-resource control idle mode. While in the enhanced radio-resource control idle mode, the user equipment [110] may receive a message [420] in accordance with the cell radio-network temporary-identifier and present the received message.

24 Claims, 6 Drawing Sheets

(51) Int. Cl.
*H04W 68/00* (2009.01)
*H04W 76/11* (2018.01)
*H04W 76/28* (2018.01)
*H04W 92/00* (2009.01)
*H04L 1/18* (2006.01)
*H04W 92/10* (2009.01)

(52) U.S. Cl.
CPC ............ *H04W 76/11* (2018.02); *H04W 76/28* (2018.02); *H04W 92/10* (2013.01)

(58) Field of Classification Search
USPC .......................................................... 370/329
See application file for complete search history.

(56) References Cited

U.S. PATENT DOCUMENTS

| | | | |
|---|---|---|---|
| 2006/0269028 A1* | 11/2006 | Bley | G01D 21/00 375/354 |
| 2009/0135769 A1 | 5/2009 | Sambhwani et al. | |
| 2009/0305711 A1 | 12/2009 | Rinne et al. | |
| 2011/0141901 A1 | 6/2011 | Luo et al. | |
| 2012/0275322 A1* | 11/2012 | Ji | H04L 1/0027 370/252 |
| 2012/0281566 A1 | 11/2012 | Pelletier et al. | |
| 2012/0329485 A1 | 12/2012 | Lee et al. | |
| 2014/0334389 A1 | 11/2014 | Mahmoud | |
| 2015/0049709 A1 | 2/2015 | Damnjanovic et al. | |
| 2015/0237501 A1 | 8/2015 | Casati et al. | |
| 2016/0337417 A1* | 11/2016 | Pudney | H04L 65/4061 |
| 2017/0366236 A1* | 12/2017 | Ryoo | H04B 7/0421 |
| 2019/0053162 A1* | 2/2019 | Islam | H04W 72/042 |
| 2020/0037345 A1* | 1/2020 | Ryoo | H04W 76/27 |

FOREIGN PATENT DOCUMENTS

| | | | | |
|---|---|---|---|---|
| KR | 20120013784 A | * | 2/2012 | ............ H04W 72/04 |
| WO | 2016077229 | | 5/2016 | |
| WO | 2017126942 | | 7/2017 | |
| WO | 2018128463 | | 7/2018 | |
| WO | WO-2018128463 A1 | * | 7/2018 | ............ H04W 68/02 |
| WO | 2020051547 | | 3/2020 | |

OTHER PUBLICATIONS

"3GPP TR 23.888 V11.0.0", 3GPP TR 23.888 V11.0.0, Sep. 2012, Sep. 2012, 165 pages.
"International Preliminary Report on Patentability", PCT Application No. PCT/US2019/050084, dated Nov. 9, 2020, 13 pages.
"International Search Report and Written Opinion", PCT Application No. PCT/US2019/050084, dated Nov. 27, 2019, 16 pages.
"Introduction of NB-IoT", 3GPP TSG-RAN WG2 NB-Iot Ad-hoc#2, Sophia-Antipolis, France, May 3-4, 2016, May 2016, 95 pages.
"RAN Impacts of CIoT CP and UP Solution for NB-IoT", 3GPP TSG RAN WG2 Meeting #93bis, Dubrovnik, Croatia, Apr. 11-15, 2016, Apr. 2016, 7 pages.
"Technical Specification Group Services and Systems Aspects; Study on Machine-Type Communications (MTC) and Other Mobile Data Applications Communications Enhancements", 3GPP TR 23.887 V12.0.0, Dec. 2013, Dec. 2013, 151 pages.
"Universal Mobile Telecommunications System (UMTS);", (3GPP TS 25.319 version 8.6.0 Release 8), Jul. 2009, 67 pages.
"Written Opinion", Application No. PCT/US2019/050084, dated Aug. 28, 2020, 7 pages.
Kim, et al., "Advanced Power Management Techniques in Next-Generation Wireless Networks", IEEE Communications Magazine • May 2010, May 2010, 9 pages.
"Foreign Office Action", IN Application No. 202147012431, dated Feb. 3, 2022, 7 pages.

* cited by examiner

ENHANCED RADIO-RESOURCE CONTROL (RRC) IDLE MODE

BACKGROUND

Radio-resource control (RRC) protocols manage radio resources of a user equipment (UE) and a base station for wireless communications. In practice, RRC protocols support services and functions, which include broadcasting system information, initiating paging, establishing/releasing wireless connections, selecting cells, handing over wireless connections, and managing quality of service.

In general, the UE may operate in one of two broadly-defined RRC modes, an RRC connected mode or an RRC idle mode. While operating in the RRC connected mode, the UE maintains uplink and downlink radio connections via scheduled resources of a unified air interface. Also, while in the RRC connected mode, for example, the UE transmits or receives messages, transmits channel quality indicators to a base station, and may transmit acknowledgment (ACK) messages to verify reception of data.

In contrast, while operating in the RRC idle mode, the UE does not maintain an uplink radio connection with the base station and a downlink radio connection with the base station may be discontinuous. While in the RRC idle mode, the UE may monitor, via the downlink connection, channels of the unified air interface for the purpose of receiving a page from the base station or performing cell measurement and selection operations. However, many other operations that may be desirable are not available to the UE while operating in the RRC idle mode, including receiving data messages that may be transmitted from the base station.

SUMMARY

The present disclosure describes techniques and systems for an enhanced radio-resource control idle mode. The described techniques and systems enable a user equipment (UE) to receive a radio-resource control release message that includes a cell radio-network temporary-identifier and, in response to receiving the radio-resource control release message, enter the enhanced radio-resource control (RRC) idle mode. While in the enhanced RRC idle mode, the UE may receive a message in accordance with the cell radio-network temporary-identifier and present the received message.

While operating in the conventional RRC idle mode of today, the UE may, through monitoring of a paging resource of a unified air interface, detect a signal from a base station that indicates a message is available for the UE. However, in order to receive the message, the UE must "wake-up", exiting the conventional RRC idle mode of today and entering the RRC connected mode to establish uplink and downlink radio connections with the base station. Further, even for a contemplated mode of RRC connected but inactive, the various possibilities of this mode include power-consuming actions not present in the RRC idle mode. Potential differences to the idle mode and the connected but inactive mode include paging and connection maintenance, for example, though others are also contemplated.

While in the RRC connected mode, power consumption levels of the UE increase due, in part, to uplink and downlink radio connections. The enhanced RRC idle mode described herein, however, reduces uplink and downlink radio connections, resulting in the UE realizing power-savings (in comparison to the RRC connected mode) while still providing a benefit of the UE receiving messages.

In some aspects, a method performed by a user equipment communicating with a base station is described. The method includes the user equipment receiving a radio-resource control release message from the base station that includes a cell radio-network temporary-identifier. Responsive to receiving the radio-resource control release message, the user equipment enters an enhanced radio-resource control idle mode having discontinuous uplink and downlink communications with the base station. While in the enhanced radio-resource control idle mode, the user equipment receives, from the base station, a message in accordance with the cell radio-network temporary-identifier. The method includes the user equipment presenting the received message to a user of the user equipment.

In some other aspects, a method performed by a base station communicating with a user equipment is described. As part of performing the method, the base station negotiates, with the user equipment, a repeating time interval for transmitting a group of messages to the user equipment. The base station transmits a radio-resource control release message that causes the user equipment to enter an enhanced radio-resource control idle mode having discontinuous uplink and downlink communications with the base station. The base station transmits the group of messages at one or more times specified by or in accordance with the negotiated repeating time interval. The method includes the base station receiving, from the user equipment, an acknowledgment that is based on the user equipment receiving the group of messages.

The invention also provides an apparatus corresponding to, or arranged to put into effect, the described methods, such as a suitably arranged user equipment and/or a suitably arranged base station. For example, in further aspects, a user equipment is described. The user equipment may include a transceiver, a display, a processor, and computer-readable storage media comprising instructions to implement an enhanced radio-resource control idle-mode manager application. The enhanced radio-resource control idle-mode manager application is configured to cause the user equipment to receive, via the transceiver and from the base station, a radio-resource control release message that includes a cell radio-network temporary-identifier and, responsive to receiving the radio-resource control release message, enter an enhanced radio-resource control idle mode having discontinuous uplink and downlink transmissions with the base station. The idle-mode manager application is further configured to cause the user equipment to receive, via the transceiver while in the enhanced radio-resource control idle mode and from the base station, a message in accordance with the cell radio-network temporary-identifier and a negotiated repeating time interval. The user equipment is also caused to present, via the display, the received message.

The details of one or more implementations are set forth in the accompanying drawings and the following description. Other features and advantages will be apparent from the description and drawings, and from the claims. This summary is provided to introduce subject matter that is further described in the Detailed Description and Drawings. Accordingly, a reader should not consider the summary to describe essential features nor limit the scope of the claimed subject matter.

BRIEF DESCRIPTION OF THE DRAWINGS

This document describes details of one or more aspects of message communications while a user equipment (UE) is in an enhanced radio-resource control (RRC) idle mode. The use of the same reference numbers in different instances in the description and the figures may indicate like elements.

DETAILED DESCRIPTION

The present disclosure describes techniques and systems for wireless communications between a base station and a user equipment operating in an enhanced radio-resource control idle mode. The enhanced radio-resource control idle mode is especially applicable to low data rate wireless communications with high latency tolerances and can coexist with a radio-resource control connected mode and a radio-resource control inactive mode. Example case uses of low data rate wireless communications with high latency tolerances include wireless communications that may be associated with Internet-of-Things (IoT) devices.

While features and concepts of the described systems and methods for such wireless communications can be implemented in any number of different environments, systems, devices, and/or various configurations, aspects are described in the context of the following example devices, systems, and configurations.

Operating Environment

Figure 1:
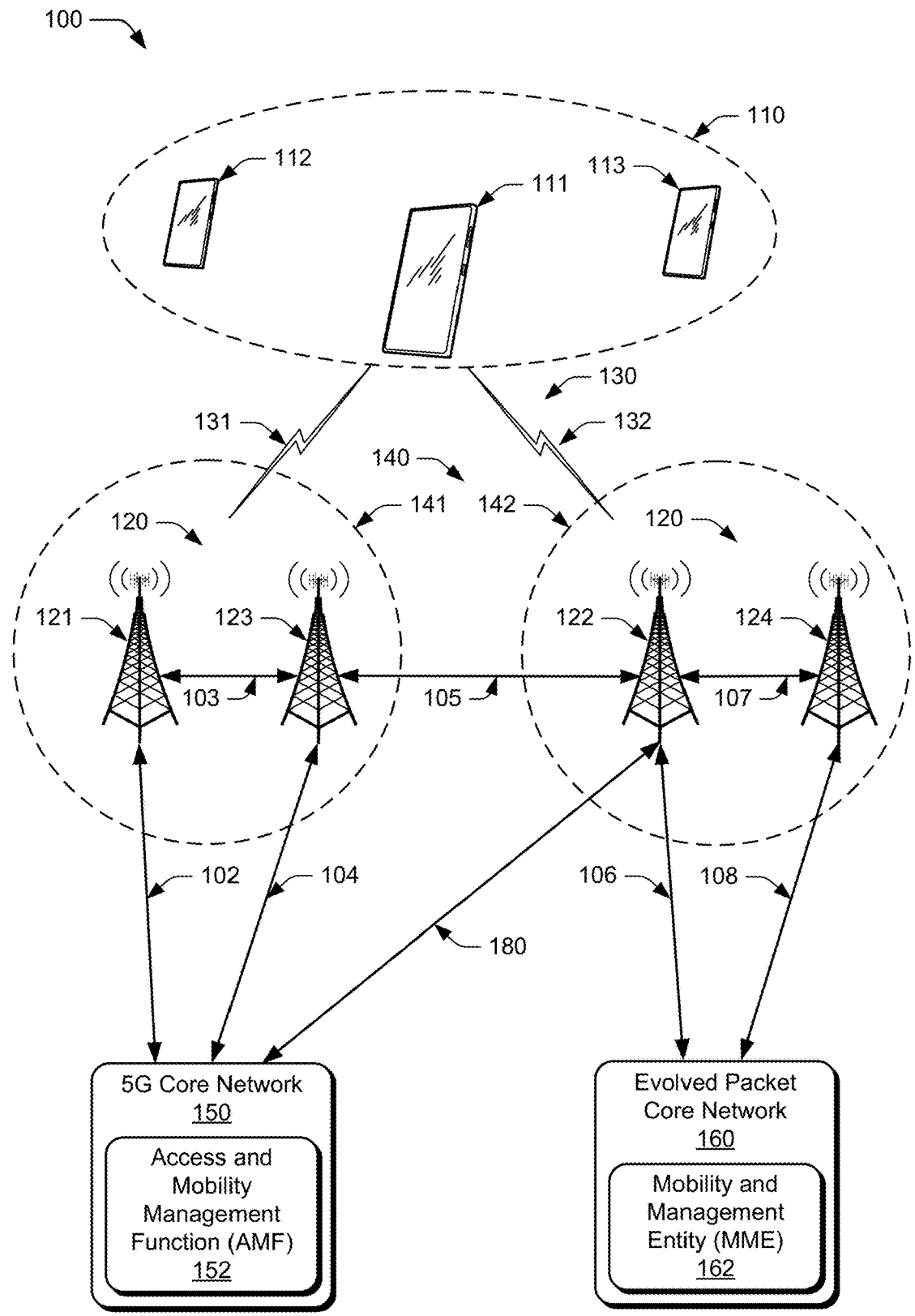
FIG. 1 illustrates an example operating environment in which various aspects of message communications while a UE is in an enhanced RRC idle mode can be implemented.

FIG. 1 illustrates an example environment 100, which includes multiple user equipment 110 (UE 110), illustrated as UE 111, UE 112, and UE 113. Each UE 110 can communicate with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base stations 120 (e.g., an Evolved Universal Terrestrial Radio Access Network Node B, E-UTRAN Node B, evolved Node B, eNodeB, eNB, Next Generation Node B, gNode B, gNB, ng-eNB, or the like) may be implemented in a macrocell, microcell, small cell, picocell, or the like, or any combination thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 may include one or more wireless links (e.g., radio links) or bearers implemented using any suitable communication protocol or standard, or combination of communication protocols or standards, such as 3rd Generation Partnership Project Long-Term Evolution (3GPP LTE), Fifth Generation New Radio (5G NR), and so forth. Multiple wireless links 130 may be aggregated in a carrier aggregation to provide a higher data rate for the UE 110. Multiple wireless links 130 from multiple base stations 120 may be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN). The RANs 140 are illustrated as an NR RAN 141 and an E-UTRAN 142. The base stations 121 and 123 in the NR RAN 141 are connected to a Fifth Generation Core 150 (5GC 150) network. The base stations 122 and 124 in the E-UTRAN 142 are connected to an Evolved Packet Core 160 (EPC 160). Optionally or additionally, the base station 122 may connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an Si interface for control-plane signaling and user-plane data communications. Optionally or additionally, if the base station 122 connects to the 5GC 150 and EPC 160 networks, the base station 122 connects to the 5GC 150 using an NG2 interface for control-plane signaling and through an NG3 interface for user-plane data communications, at 180.

In addition to connections to core networks, the base stations 120 may communicate with each other. For example, the base stations 121 and 123 communicate through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRA network. The AMF 152 and the MME 162 communicate with the base stations 120 in the RANs 140 and communicate with multiple UE 110, using the base stations 120.

Within the environment 100, the UE 110 can operate in either a radio-resource control (RRC) connected mode, during which the UE 110 and the base stations 120 maintain uplink and downlink radio connections, or in an enhanced radio-resource control (RRC) idle mode, during which uplink and downlink radio connections are not maintained.

While in the enhanced RRC idle mode, the UE 110 has discontinuous uplink and downlink communications with the base stations 120.

Furthermore, within the environment 100, wireless communications between the UE 110 and the base stations 120 may be associated with a cell radio-network temporary-identifier (CRNTI). The CRNTI, in general, may indicate, to both the UE 110 and the base stations 120, specific resources of the unified air interface resource that supports wireless communications between the UE 110 and the base stations 120 if the UE 110 is operating in the enhanced RRC idle mode. The CRNTI may also be used to scramble and decode messages transmitted from the base stations 120 to the UE 110 while the UE 110 is operating in the enhanced RRC idle mode.

Figure 2:
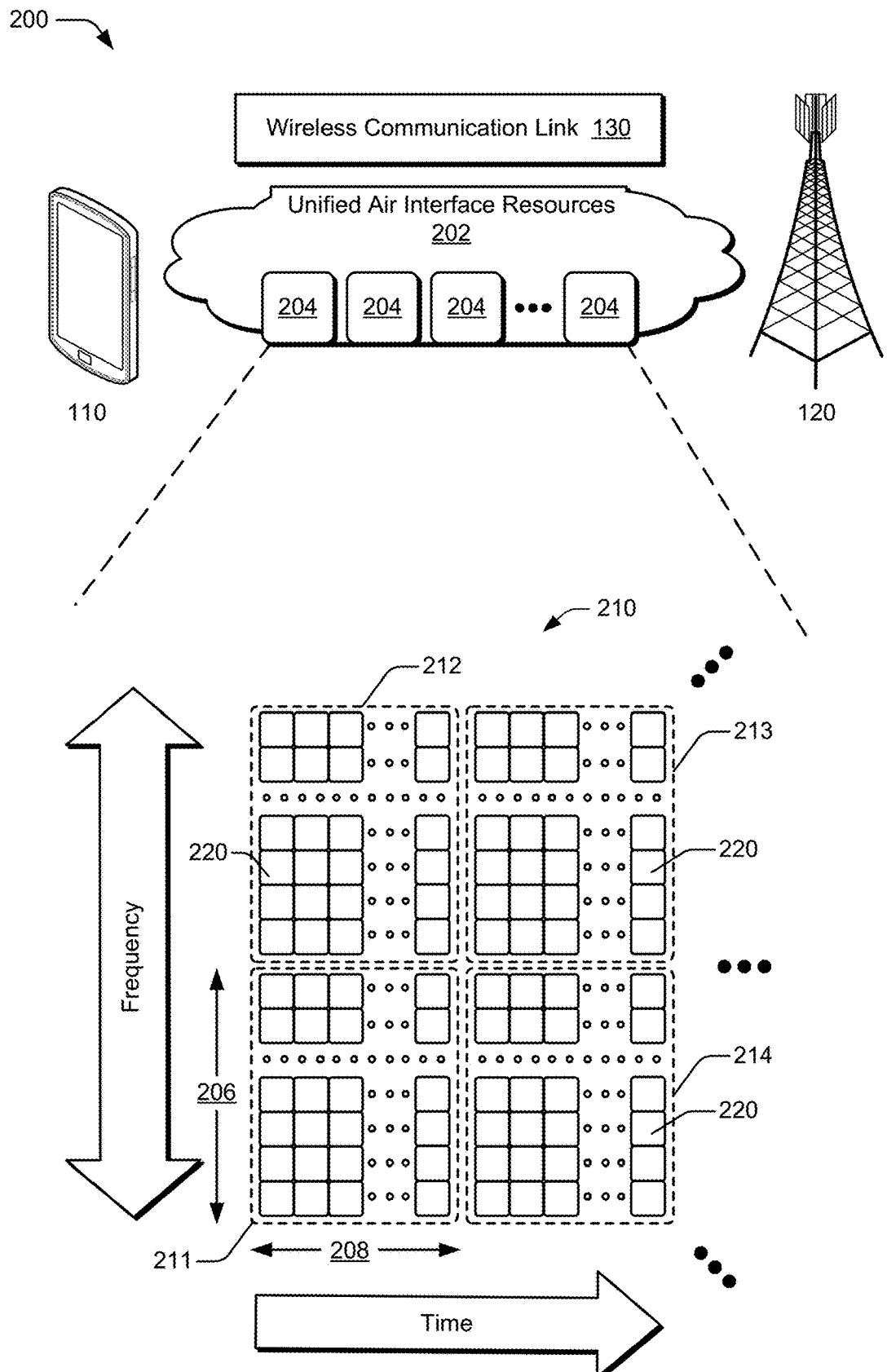
FIG. 2 illustrates an example interface that extends between a user equipment and a base station, which is associated with message communications while the UE is operating in an enhanced RRC idle mode.

FIG. 2 illustrates an example interface 200 that extends between a UE (e.g., the UE 110) and a base station (e.g., the base station 120), which is associated with message communications while the UE 110 is operating in an enhanced RRC idle mode. The example interface 200 includes unified air interface resources 202 can be divided into resource units 204, each of which occupies some intersection of frequency spectrum and elapsed time. A portion of the unified air interface resources 202 is illustrated graphically in a grid or matrix having multiple resource blocks 210, including example resource blocks 211, 212, 213, 214. An example of a resource unit 204 therefore includes at least one resource block 210. As shown, time is depicted along the horizontal dimension as the abscissa axis, and frequency is depicted along the vertical dimension as the ordinate axis. The unified air interface resources 202, as defined by a given communication protocol or standard, may span any suitable specified frequency range, and/or may be divided into intervals of any specified duration. Increments of time can correspond to, for example, milliseconds (mSec). Increments of frequency can correspond to, for example, megahertz (MHz).

In example operations generally, the base station 120 schedules and allocates portions (e.g., resource units 204) of the unified air interface resources 202 for uplink and downlink communications. Each resource block 211 of network access resources may be allocated to support a wireless link 130 of the user equipment 110. In the lower-left corner of the grid, the resource block 211 may span, as defined by a given communication protocol, a specified frequency range 206 and comprise multiple subcarriers or frequency sub-bands. The resource block 211 may include any suitable number of subcarriers (e.g., 12) that each corresponds to a respective portion (e.g., 15 kHz) of the specified frequency range 206 (e.g., 180 kHz). The resource block 211 may also span, as defined by the given communication protocol, a specified time interval 208 or time slot (e.g., lasting approximately one-half millisecond or 7 orthogonal frequency-division multiplexing (OFDM) symbols). The time interval 208 includes subintervals that may each correspond to a symbol, such as an OFDM symbol. As shown in FIG. 2, each resource block 210 may include multiple resource elements 220 (REs) that correspond to, or are defined by, a subcarrier of the frequency range 206 and a subinterval (or symbol) of the time interval 208. Alternatively, a given resource element 220 may span more than one frequency subcarrier or symbol. Thus, a resource unit 204 may include at least one resource block 210, at least one resource element 220, and so forth.

As part of wireless communications between the UE 110 and the base station 120, scheduling and allocations of the unified air interface resources 202, as performed the base station 120, may be dynamic. In one aspect, for the UE 110 to operate in the aforementioned radio-resource control (RRC) connected mode, the base station 120 may schedule and allocate available resource units 204 to support uplink and downlink communications between the UE 110 and the base station 120. In another aspect, for the UE 110 to operate in the aforementioned enhanced radio-resource control (RRC) idle mode, the base station 120 may schedule and allocate available resource units 204 for intermittent uplink and downlink communications between the UE 110 and the base station 120.

As an example of scheduling and allocation in accordance with the RRC connected mode, the base station 120 may schedule and allocate available resource units 204 in the form of transport channels of the unified air interface resources 202. In general, the transport channels of the unified air interface resources 202, in accordance with wireless communication protocols, are used for transporting information between the base station 120 and the UE 110. Using the transport channels, the base station 120 and the UE 110 may exchange information that defines how and with what type of characteristics data is transferring from the base station 120 to the UE 110. The scheduled and allocated transport channels may support uplink communications from the UE 110 to the base station 120, and include, for example, one or more of an uplink shared channel (UL-SCH) or a random access channel (RACH). The scheduled and allocated transport channels may also support downlink communications from the base station 120 to the user equipment and can include, as an example, one or more of a broadcast channel (BCH), a downlink shared channel (DL-SCH), a paging channel (PCH), or a multicast channel (MCH). In accordance with the example of the scheduled and allocated transport channels, the UE 110 and the base station 120 may maintain uplink and downlink radio connections using these channels.

In certain instances, however, methods and characteristics of transmitting from the base station 120 to the user equipment 110 may be known. For example, if a unicast message such as a text or SMS message is transmitting from the base station 120, the methods and characteristics of transmitting the data may be known by both the UE 110 and the base station 120. As a result, fewer resources of the unified air interface are required, and such resources may be scheduled and allocated in accordance with the enhanced RRC idle mode.

As an example of scheduling and allocation in accordance with the enhanced RRC idle mode, the base station 120 may schedule and allocate, in accordance with intermittent time periods, available resource units 204 of the unified air interface resources 202. The resource units 204 may comprise the aforementioned paging channel (PCH), as well as physical channels such as a physical downlink control channel (PDCCH), a physical random access channel (PRACH), and a physical uplink control channel (PUCCH). As part of scheduling and allocation, the base station 120 may associate a cell radio-network temporary-identifier (CRNTI) to the scheduled and allocated resource units 204.

The example combination of the PCH channel, the PDCCH channel, and the PRACH channel is a non-limiting example of scheduling of and allocating channels of the unified air interface resources 202. Scheduling and allocation of other combinations of channels that are available via the unified air interface resources 202 may be possible in the enhanced RRC idle mode.

The intermittent time periods may correspond to singular occasions (e.g., points in time), periodicities, or combinations thereof. In some instances, parameters that define the intermittent time periods may be included in a radio-resource control release message transmitted from the base station 120 to the UE 110. In other instances, the parameters that define the intermittent time periods may be negotiated between the UE 110 and the base station 120.

In certain instances, the base station may 120 may determine the cell radio-network temporary-identifier (CRNTI), while in other instances the 5GC 150 may provide the CRNTI to the base station 120. In either instance, the base station may provide the CRNTI to the UE 110 as part of a radio resource-control release message that causes the UE 110 to enter the enhanced RRC idle mode.

Example Devices

Figure 3:
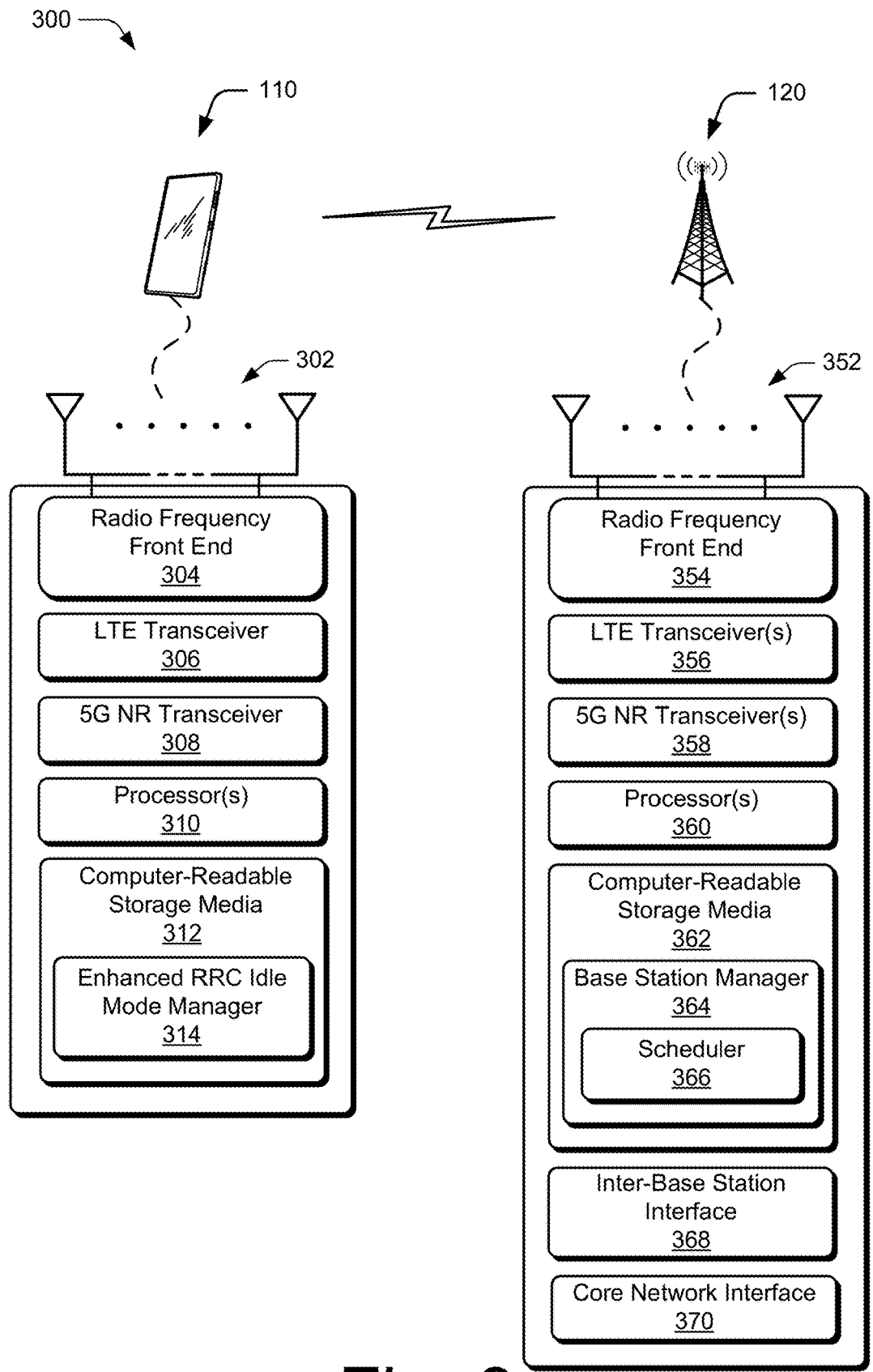
FIG. 3 illustrates an example device diagram for devices that can implement various aspects of message communications while a UE is operating in an enhanced RRC idle mode.

FIG. 3 illustrates an example device diagram 300 of a UE (e.g., the UE 110 of FIG. 1) and a base station (e.g., the base stations 120 of FIG. 1). The UE 110 and the base station 120 may include additional functions and interfaces that are omitted from FIG. 3 for the sake of clarity. The UE 110 includes antennas 302, a radio frequency front end 304 (RF front end 304), an LTE transceiver 306, and a 5G NR transceiver 308 for communicating with base stations 120. The RF front end 304 of the UE 110 can couple or connect the LTE transceiver 306, and the 5G NR transceiver 308 to the antennas 302 to facilitate various types of wireless communication. The antennas 302 of the UE 110 may include an array of multiple antennas that are configured similar to or differently from each other. The antennas 302 and the RF front end 304 can be tuned to, and/or be tunable to, one or more frequency bands defined by the 3GPP LTE and 5G NR communication standards and implemented by the LTE transceiver 306, and/or the 5G NR transceiver 308. Additionally, the antennas 302, the RF front end 304, the LTE transceiver 306, and/or the 5G NR transceiver 308 may be configured to support beamforming for the transmission and reception of communications with the base stations 120. By way of example and not limitation, the antennas 302 and the RF front end 304 can be implemented for operation in sub-gigahertz bands, sub-6 GHz bands, and/or above 6 GHz bands that are defined by the 3GPP LTE and 5G NR communication standards.

The UE 110 also includes processor(s) 310 and computer-readable storage media 312 (CRM 312). The processor 310 may be a single core processor or a multiple core processor composed of a variety of materials, such as silicon, polysilicon, high-K dielectric, copper, and so on. The computer-readable storage media described herein excludes propagating signals. CRM 312 may include any suitable memory or storage device such as random-access memory (RAM), static RAM (SRAM), dynamic RAM (DRAM), non-volatile RAM (NVRAM), read-only memory (ROM), or Flash memory.

CRM 312 also includes an enhanced RRC idle mode manager application 314. Alternately or additionally, the enhanced RRC idle mode manager application 314 may be implemented in whole or part as hardware logic or circuitry integrated with or separate from other components of the UE 110. In at least some aspects, the enhanced RRC idle mode manager application 314 configures the RF front end 304, the LTE transceiver 306, and/or the 5G NR transceiver 308 to implement the techniques for operating in the enhanced RRC idle mode as described herein.

The device diagram for the base station 120, shown in FIG. 3, includes a single network node (e.g., a gNode B). The functionality of the base station 120 may be distributed across multiple network nodes or devices and may be distributed in any fashion suitable to perform the functions described herein. The base stations 120 include antennas 352, a radio frequency front end 354 (RF front end 354), one or more LTE transceivers 356, and/or one or more 5G NR transceivers 358 for communicating with the UE 110. The RF front end 354 of the base stations 120 can couple or connect the LTE transceivers 356 and the 5G NR transceivers 358 to the antennas 352 to facilitate various types of wireless communication. The antennas 352 of the base stations 120 may include an array of multiple antennas that are configured similar to or differently from each other. The antennas 352 and the RF front end 354 can be tuned to, and/or be tunable to, one or more frequency bands defined by the 3GPP LTE and 5G NR communication standards, and implemented by the LTE transceivers 356, and/or the 5G NR transceivers 358. Additionally, the antennas 352, the RF front end 354, the LTE transceivers 356, and/or the 5G NR transceivers 358 may be configured to support beamforming, such as Massive-MIMO, for the transmission and reception of communications with the UE 110.

The base station 120 also includes processor(s) 360 and computer-readable storage media 362 (CRM 362). The processor 360 may be a single core processor or a multiple core processor composed of a variety of materials, such as silicon, polysilicon, high-K dielectric, copper, and so on. CRM 362 may include any suitable memory or storage device such as random-access memory (RAM), static RAM (SRAM), dynamic RAM (DRAM), non-volatile RAM (NVRAM), read-only memory (ROM), or Flash memory. The CRM 362 also includes a base station manager 364. Alternately or additionally, the base station manager 364 may be implemented in whole or part as hardware logic or circuitry integrated with or separate from other components of the base station 120. The base station manager 364 includes a scheduler 366 that schedules and allocates resources of a unified air interface supporting wireless communications between the UE 110 and the base station 120. The base station 120 may execute code of the scheduler 366 to schedule resources a unified air interface (e.g., the unified air interface resources 202 of FIG. 2) in accordance with a cell radio-network temporary-identifier.

In at least some aspects, the base station manager 364 configures the RF front end 354, the LTE transceiver 356, and/or the 5G NR transceiver 358 to implement the techniques for supporting wireless communications with the UE 110 in support of the enhanced RRC idle mode as described herein.

The base station 120 includes an inter-base station interface 368, such as an Xn and/or X2 interface, which the base station manager 364 configures to exchange user-plane and control-plane data between another base station to manage the communication of the base station 120 with the UE 110. The base station 120 also includes a core network interface 370 that the base station manager 364 configures to exchange user-plane and control-plane data with core network functions and entities.

Enhanced RRC Idle Mode Signaling and Control Transactions

Figure 4:
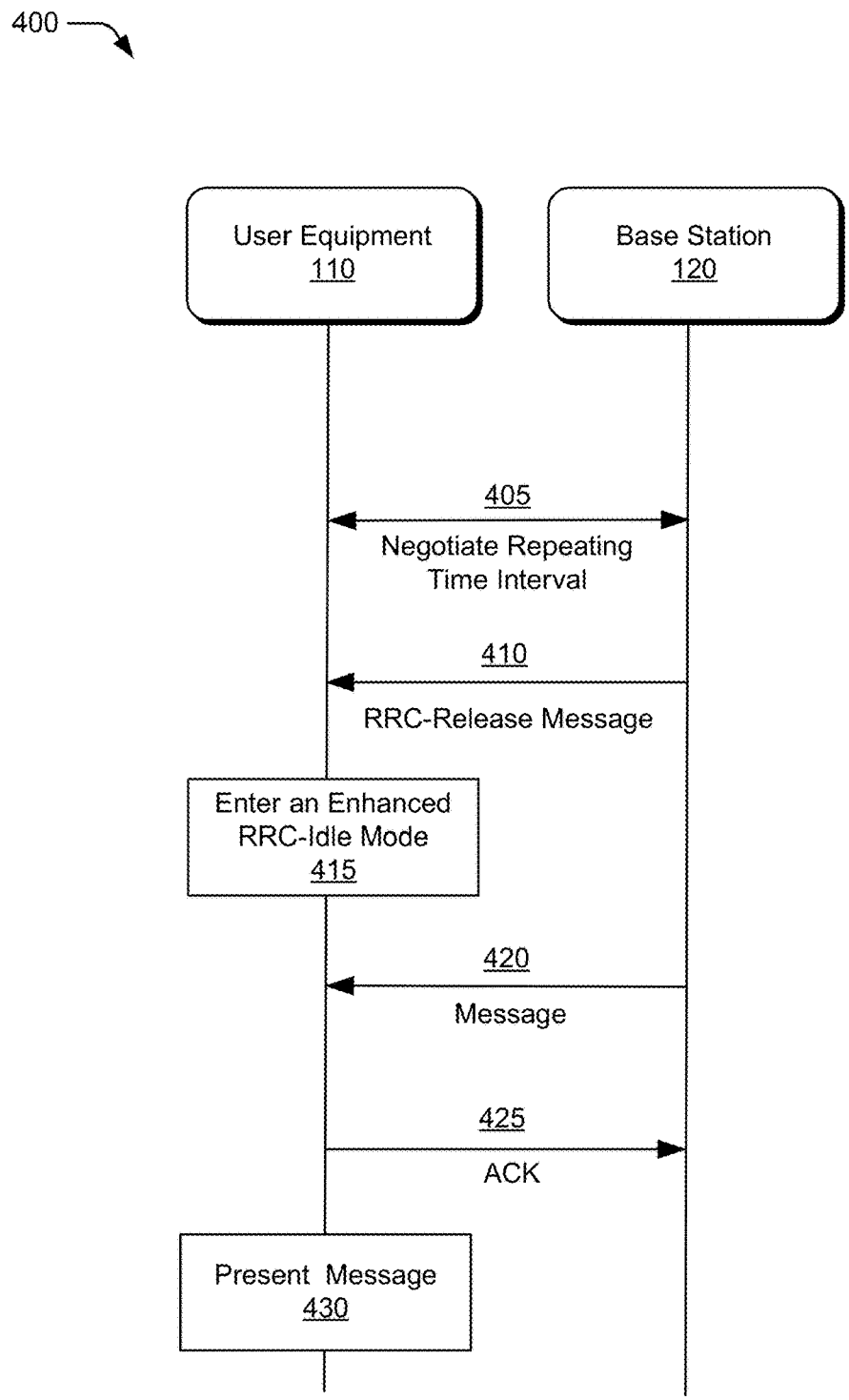
FIG. 4 illustrates details of example signaling and control transactions of a user equipment (UE) and a base station in accordance with one or more aspects of the UE operating in an enhanced RRC idle mode.

FIG. 4 illustrates details of example signaling and control transactions of a user equipment (UE) and a base station in accordance with various aspects of the UE operating in an enhanced RRC idle mode. The UE (e.g., the UE 110 of FIG. 1) and the base station (e.g., the base station 120 of FIG. 1) may wirelessly communicate and format the signaling and control transactions in accordance with data frames or subframes of wireless communication protocols.

In aspects, at 405 the UE 110 and the base station 120 may, via resources of a unified air interface (e.g., the unified air interface resources 202 of FIG. 2) exchange signaling and information as part of negotiating a repeating time interval. Negotiating the repeating time interval may include transacting data that is representative of intervals associated with paging operations the base station intends to perform using a paging channel of the unified air interface. In certain instances, wireless communication protocols may govern that the paging operations performed by a base station occur use a specific time interval, such as 1.28 seconds or 2.56 seconds. Negotiating the repeating time interval may also include negotiating an occurrence (e.g., a single point in time) for either receiving a single message or initiating receipt of a group of messages in accordance with a repeating time interval. The transactions at 405 may occur while the UE 110 is operating in an RRC connected mode.

At 410, the base station 120 may send, to the UE 110, a radio-resource control (RRC) release message. The RRC release message, a control transaction that causes the UE 110 to enter an enhanced RRC idle mode at 415, may include a cell radio-network temporary-identifier (CRNTI). In some instances, the base station 120 may determine the CRNTI while in other instances the base station 120 may receive the CRNTI from another entity, such as a core network (e.g., the 5GC 150 of FIG. 1) or another base station. The CRNTI may indicate resources of an air interface (e.g., the unified air interface resources 202 of FIG. 2) to be used between the UE 110 and the base station 120 while the UE 110 is operating in the enhanced RRC idle mode. The CRNTI may also be used to scramble and decode messages transmitted from the base station 120 to the UE 110 while the UE 110 is operating in the enhanced RRC idle mode.

At 420, the UE 110 receives, from the base station 120, a message. Receiving the message may include receiving, for example, a unicast short-message service (SMS) or a group of SMS messages. Receipt of the SMS message or the group of SMS messages occurs in temporal proximity to one or more occurrences (e.g., points in time) that correspond to the repeating time interval negotiated at 405. Furthermore, in certain instances the received message may be scrambled in accordance with the CRNTI received at 410 while in other instances, the received message may be encrypted.

At 425, the UE 110 sends, to the base station, an acknowledgment (ACK). In some instances, the ACK may acknowledge receipt of a single message while in other instances the ACK my acknowledge receipt of a group of messages. The UE may send the ACK via a physical random access channel (PRACH) resource of the unified air interface. After sending the ACK, the UE 110 may then perform at 430 an operation that includes presenting the message or group of messages (e.g., via a visual display, audio speaker, and/or other user interface component).

The described signaling and control transactions are by way of example only, and are not constrained by the sequence or order of presentation. Furthermore, in certain aspects, additional signaling and control transactions may augment or replace the described signaling and control transactions. Such additional signaling and control transactions may include, for example, signaling and control transactions associated with the base station 120 communicating with a core network (e.g., the 5GC 150 to receive a CRNTI) or the base station 120 communicating with other base stations (to synchronize transmission of one or more messages of a group of messages).

Enhanced RRC Idle Mode Methods

Figure 5:
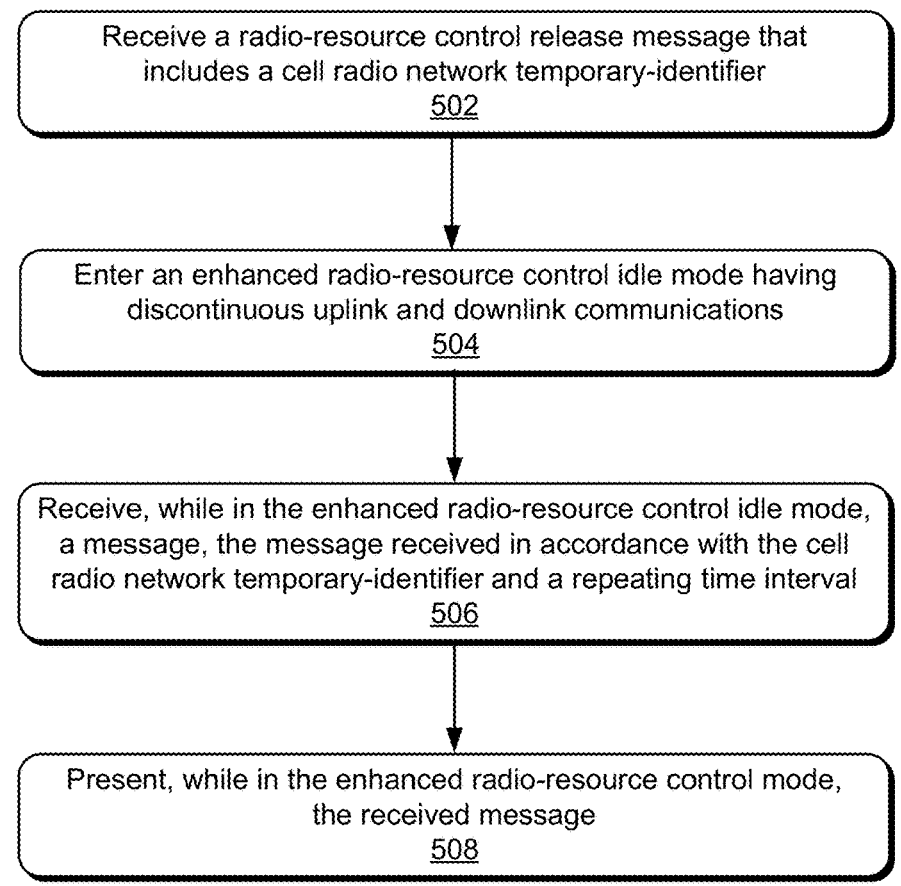
FIG. 5 illustrates an example method performed by a user equipment communicating with a base station in accordance with one or more aspects of the UE operating in an enhanced RRC idle mode.

FIG. 5 illustrates an example method 500 performed by a user equipment communicating with a base station in accordance with one or more aspects of the user equipment operating in an enhanced RRC idle mode. Operations performed by the UE (e.g., the UE 110 of FIG. 1) and the base station (e.g., the base station 120 of FIG. 1) are not limited to the order or sequence of operations as described below. Furthermore, and in general, operations performed by the UE 110 are caused by the processor 310 of the UE 110 executing code or instructions of the enhanced RRC idle mode manager application 314.

At operation 502, the UE 110 receives, from the base station 120, a radio-resource control release message that includes a cell radio-network temporary-identifier (CRNTI). In some instances, the CRNTI may be determined by the base station 120 while in other instances the CRNTI may be provided to the base station 120 by another entity, such as another base station or a core network (e.g., the 5GC 150 of FIG. 1).

At operation 504, and in response to receiving the radio-resource control signal, the UE 110 enters an enhanced radio-resource control idle mode. The enhanced radio-resource control idle mode may be a mode having discontinuous uplink and downlink communications with the base station.

At operation 506 and while in the enhanced RRC idle mode, the UE 110 receives a message. The message may be, for example, a unicast message that is a short message service (SMS) message such as a text or the like.

The message may be received in accordance with the CRNTI received at operation 502. The CRNTI may include information that specifies, for example, resources of a unified air interface (e.g., the unified air interface resources 202 of FIG. 2) for use while the UE 110 is in the enhanced RRC idle mode.

The message received at operation 506 may be also be received in accordance with a repeating time interval. In certain instances, the repeating time interval may be a result of the UE 110 and the base station 120 negotiating via a series of data exchanges. Such negotiations may include, for example, exchanges of acknowledgment (ACK) or non-acknowledgment (NACK) messages with the base station 120, proposing to the base station 120 a repeating time interval based on a projected power consumption level by the UE 110, or the like. In other instances, a core network may determine the repeating time interval (e.g., the 5GC 150 of FIG. 1) and provide the repeating time interval to the UE 110 via the base station.

The repeating time interval may be an occurrence (e.g., a single point in time) for either receiving a single message or initiating receipt of a group of messages in accordance with a repeating time interval. The repeating time interval may, in some instances, correspond to pages sent from the base station via a paging channel in accordance with a wireless communication protocol.

The received message may include multiple aspects. For example, the received message may be a unicast message that is a short-message service (SMS) message, such as a text message. The received message may also be a group of messages that are received in accordance with the repeating time interval.

At operation 508 and after receipt of the message, the UE 110 may, while remaining in the enhanced RRC idle mode, present the received message. Presentation of the received message may include, for example, presenting the received message via a display of the UE, audibly replicating the message via an audio output of the UE 110, or the like.

The example method 500 may be modified to include additional operations that include, for example, the UE 110 negotiating the repeating time interval (for potential receipt of the message) with the base station 120 prior to the UE 110 entering the enhanced radio-resource control idle mode. Additional operations may also include the UE 110 decrypting the received message, descrambling the received message based on the received CRNTI, or transmitting an acknowledgment (ACK) message to the base station 120 that confirms the reception of the message. In the instance of transmitting the ACK message, the UE 110 may transmit, to the base station 120, an individual ACK message based on reception of an individual message or, alternatively, accumulating a group of received messages and transmit a group ACK message. Such ACK messages may be transmitted via resources corresponding to a physical random access channel (PRACH) of the unified air interface resources 202. The UE 110 may also store, via a CRM of the UE 110 (e.g., the CRM 312) the received message.

Figure 6:
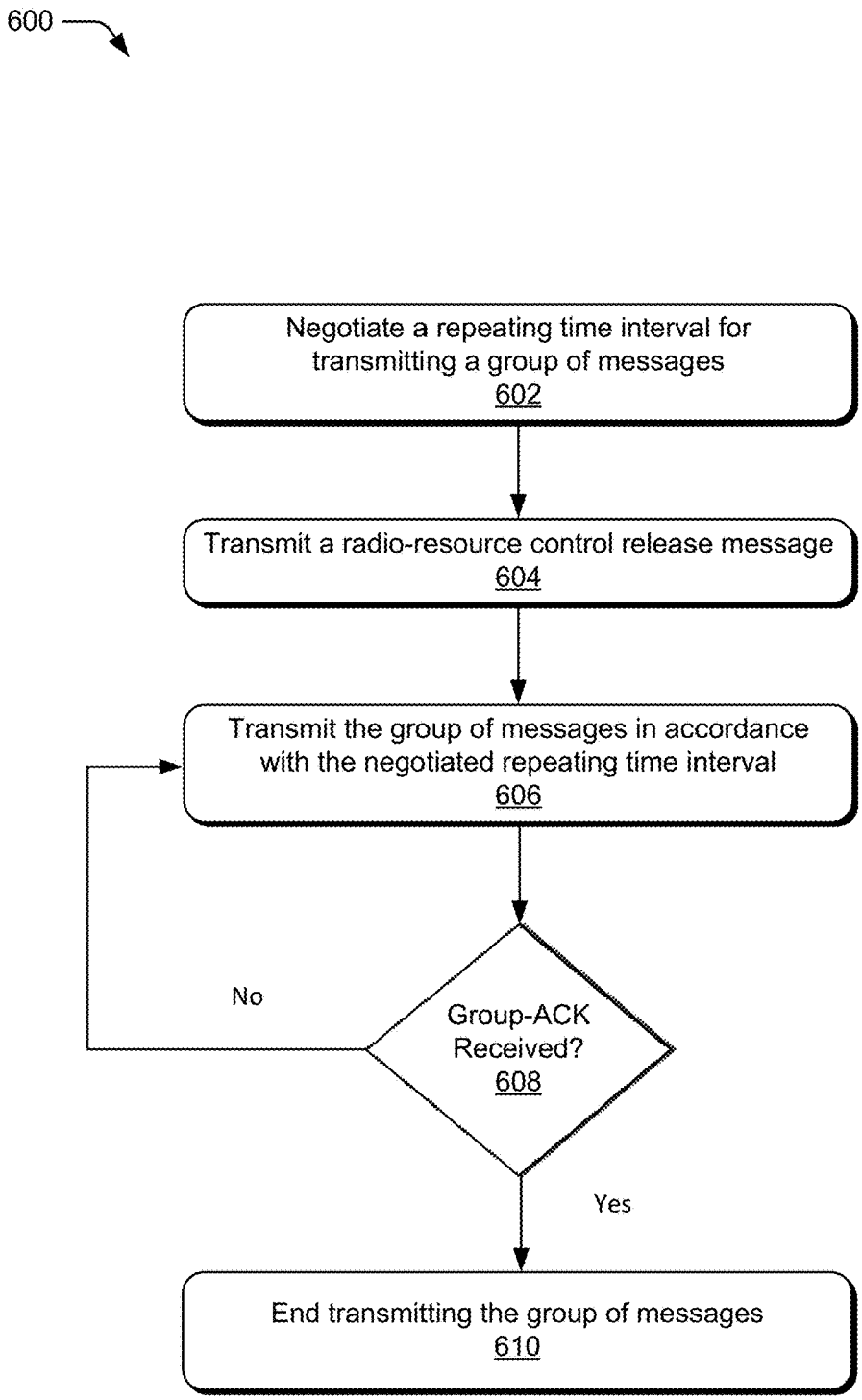
FIG. 6 illustrates an example method performed by a base station communicating with a user equipment in accordance with one or more aspects of the UE operating in an enhanced RRC idle mode.

FIG. 6 illustrates an example method 600 performed by a base station communicating with a user equipment in accordance with one or more aspects of the user equipment operating in an enhanced RRC idle mode. Operations performed by the base station (e.g., the base station 120 of FIG. 1) and the user equipment (e.g., the UE 110 of FIG. 1) are not limited to the order or sequence of operations as described below. Furthermore, and in general, operations performed by the base station 120 are caused by the processor 360 of the base station executing code or instructions of the base station manager 364.

At operation 602 the base station negotiates a repeating time interval with the UE 110 for transmitting, to the UE 110, a group of messages. Negotiating the repeating time interval may be a result of multiple data exchanges with the UE 110. Negotiations may include the base station 120 consulting records of scheduled and allocated resources of the unified air interface resources 202, exchanges of acknowledgment (ACK) or non-acknowledgment (NACK) messages with the UE 110, receiving proposals from UE 110 based on a projected power consumption level by the UE 110, or the like. In other instances, a core network may determine the repeating time interval (e.g., the 5GC 150 of FIG. 1) and provide the repeating time interval to the base station 120. The repeating time interval may include an occurrence (e.g., a single point in time) for initiating transmission of the group of messages in accordance with a repeating time interval. The repeating time interval may, in some instances, correspond to intervals associated with pages the base station 120 sends via a paging channel in accordance with a wireless communication protocol.

At operation 604, the base station 120 transmits, to the UE 110, a radio-resource control (RRC) release message, causing the UE 110 to enter an enhanced radio-resource control idle mode.

At operation 606, the base station 120 transmits, to the UE 110 while the UE 110 is in the enhanced RRC idle mode, the group of messages in accordance with the negotiated repeating time interval. In certain instances, at least one message of the group of messages may be a unicast message that is a short-message service (SMS) message, such as a text message. Transmitting the group of messages may include, in certain instances, scrambling each message of the group of messages in accordance with a cell radio-network temporary-identifier (CRNTI) that is determined by the base station 120 or provided to the base station 120 by another entity, such as another base station or a core network (e.g., the 5GC 150 of FIG. 1).

At operation 608, the base station 120 determines if a group acknowledgement, based on the UE 110 receiving the group of messages, has been received from the UE 110. If the group acknowledgment has not been received, the base station retransmits the group of messages in accordance with the negotiated repeating time interval (e.g., returns to operation 606). The base station 120 may perform a limited number of retransmission attempts.

At operation 610, the base station 120 ends transmitting the group of messages. In some instances, operation 610 may be in response to the base station 120 determining that the group acknowledgement has been received from the UE 110. In other instances, operation 610 may be in response to the base station 120 completing the limited number of retransmission attempts.

The example method 600 may be modified to include additional operations that include, for example, the base station 120 communicating with other base stations to synchronize transmitting one or more of the group of messages. Such communications may occur base via an Xn interface.

Although aspects of an enhanced radio-resource control idle mode have described in language specific to features and/or methods, the subject of the appended claims is not necessarily limited to the specific features or methods described. Rather, the specific features and methods are disclosed as example implementations of the enhanced radio-resource control idle mode, and other equivalent features and methods are intended to be within the scope of the appended claims. Further, various different aspects are described, and it is to be appreciated that each described aspect can be implemented independently or in connection with one or more other described aspects.

In the following, several examples are described.

Example 1

A method performed by a user equipment communicating with a base station, the method comprising: receiving, from the base station, a radio-resource control release message that includes a cell radio-network temporary-identifier; entering, responsive to receiving the radio-resource control release message, an enhanced radio-resource control idle mode having discontinuous uplink and downlink communications with the base station; receiving, while in the radio-resource control idle mode and from the base station, a message, the message received in accordance with the cell radio-network temporary-identifier; and presenting, while in the enhanced radio-resource control idle mode and to a user, the received message.

Example 2

The method as recited in example 1, further comprising, prior to entering the enhanced radio-resource control idle mode: negotiating, with the base station, a repeating time interval for potential receipt of the message Example 3

The method as recited in example 2, wherein the repeating time interval is determined by a core network and provided, to the user equipment, via the base station.

Example 4

The method as recited in any of examples 1 to 3, wherein receiving the message includes receiving a unicast message that is a short-message service message.

Example 5

The method as recited in any of examples 1 to 4, wherein receiving the message includes receiving an encrypted message.

Example 6

The method as recited in example 6, further comprising decrypting the received encrypted message.

Example 7

The method as recited in any of examples 4 to 6, further comprising transmitting, to the base station, an acknowledgment message that confirms the receiving of the message.

Example 8

The method as recited in any preceding example, wherein receiving the message includes receiving a group of messages.

Example 9

The method as recited in example 8, further comprising accumulating the group of messages and sending, to the base station, a group acknowledgment message that confirms the receiving of the group of messages.

Example 10

The method as recited in example 9, wherein sending the group acknowledgment message includes sending the group acknowledgment message via specific physical random access channel resources of a unified air interface.

Example 11

A method performed by a base station communicating with a user equipment, the method comprising: negotiating a repeating time interval for transmitting a group of messages to the user equipment; transmitting, to the user equipment, a radio-resource control release message, the radio-resource control signal causing the user equipment to enter an enhanced radio-resource control idle mode having discontinuous uplink and downlink communications with the base station; transmitting, to the user equipment while the user equipment is in the enhanced radio-resource control idle mode, the group of messages in accordance with the negotiated repeating time interval; and receiving, from the user equipment, a group acknowledgment, the group acknowledgment based on accumulating the group of messages by the user equipment and effective to circumvent retransmission of the group of messages by the base station.

Example 12

The method as recited in example 11, wherein negotiating the repeating time interval comprises negotiating a repeating time interval that corresponds to intervals associated with pages sent from the base station via a paging channel.

Example 13

The method as recited in example 11 or 12, further comprising communicating with other base stations to synchronize transmitting one or more of the group of messages.

Example 14

The method as recited in example 13, wherein communicating with the other base stations includes communicating via an Xn interface.

Example 15

The method as recited in any of examples 11 to 14, wherein at least one message of the group of messages is a unicast message that is a short-message service message.

Example 16

The method as recited in any of examples 11 to 15, wherein transmitting the group of messages includes scrambling each message of the group of messages in accordance with a cell radio-network temporary-identifier.

Example 17

A user equipment comprising: a transceiver; a display; and a processor and computer-readable storage media comprising instructions to implement an enhanced radio-resource control idle mode manager application, the enhanced radio-resource control idle mode manager application configured to cause the user equipment to: receive, via the transceiver and from the base station, a radio-resource control release message that includes a cell radio-network temporary-identifier; enter, responsive to receiving the radio-resource control release message, an enhanced radio-resource control idle mode having discontinuous uplink and downlink communications with the base station; receive, via the transceiver while in the radio-resource control idle mode and from the base station, a message, the message received in accordance with the cell radio-network temporary-identifier and a negotiated repeating time interval; and present, via the display while in the enhanced radio-resource control idle mode, the received message.

Example 18

The user equipment as recited in example 17, wherein the enhanced radio-resource control idle-mode manager application is further configured to cause the user equipment to accumulate a group of messages and transmit, to the base station, a group acknowledgment message that circumvents the base station from retransmitting a message from the group of messages.

Example 19

The user equipment as recited in example 18, wherein the received message is an encrypted message and the enhanced radio-resource control idle-mode manager application is further configured to decrypt the message.

Example 20

The user equipment as recited in any of examples 17 to 19, wherein the user equipment is a cellular phone, a smartphone, a tablet, or a laptop computer.

Example 21

A base station that can perform the method as recited in any of examples 11 to 16.

Example 22

A user equipment comprising: a transceiver; a display; and a processor and computer-readable storage media comprising instructions to implement an enhanced radio-resource control idle mode manager application, the enhanced radio-resource control idle mode manager application configured to direct the user equipment to perform the method as recited in any of examples 1 to 8.

What is claimed is:

1. A method performed by a user equipment communicating with a base station, the method comprising:
   negotiating, with the base station, a repeating time interval for potential receipt of a message;
   receiving, from the base station, a radio-resource control release message that includes a cell radio-network temporary-identifier;
   entering, responsive to receiving the radio-resource control release message, an enhanced radio-resource control idle mode having discontinuous uplink and downlink communications with the base station;
   receiving, while in the enhanced radio-resource control idle mode and from the base station, a message, the message received in accordance with the cell radio-network temporary-identifier and the negotiated repeating time interval; and
   presenting, while in the enhanced radio-resource control idle mode, the received message.

2. The method as recited in claim 1, wherein the repeating time interval is determined by a core network and provided, to the user equipment, via the base station.

3. The method as recited in claim 1, wherein receiving the message includes:
   receiving a unicast message that is a short-message service message.

4. The method as recited in claim 1, further comprising:
   transmitting, to the base station, an acknowledgment message that confirms the receiving of the message.

5. The method as recited in claim 1, wherein receiving the message includes receiving a group of messages.

6. The method as recited in claim 5, further comprising sending, to the base station, a group acknowledgment message that confirms the receiving of the group of messages.

7. The method as recited in claim 6, wherein sending the group acknowledgment message includes sending the group acknowledgment message via specific physical random access channel resources of a unified air interface.

8. The method as recited by claim 1, wherein negotiating the repeating time interval is based on a projected power consumption level by the user equipment.

9. The method of claim 1, wherein the entering, responsive to receiving the radio-resource control release message, an enhanced radio-resource control idle mode comprises:
   entering, responsive to receiving the radio-resource control release message, an enhanced radio-control idle mode having discontinuous uplink and downlink communications with the base station.

10. A method performed by a base station communicating with a user equipment, the method comprising:
    negotiating a repeating time interval for transmitting a group of messages to the user equipment;
    transmitting, to the user equipment, a radio-resource control release message that includes a cell radio-network temporary-identifier, the radio-resource control release message causing the user equipment to enter an enhanced radio-resource control idle mode having discontinuous downlink communications with the base station;
    transmitting, to the user equipment while the user equipment is in the enhanced radio-resource control idle mode, the group of messages in accordance with the cell radio-network temporary-identifier and the negotiated repeating time interval; and
    receiving, from the user equipment, a group acknowledgment, the group acknowledgment based on receiving the group of messages by the user equipment and effective to circumvent retransmission of the group of messages by the base station.

11. The method as recited in claim 10, wherein negotiating the repeating time interval comprises negotiating a repeating time interval that corresponds to intervals associated with pages sent from the base station via a paging channel.

12. The method as recited in claim 10, further comprising communicating with other base stations to synchronize transmitting one or more messages from the group of messages.

13. The method as recited in claim 10, further comprising retransmitting the group of messages in accordance with the negotiated repeating time interval if the group acknowledgment has not been received.

14. The method as recited in claim 10, wherein at least one message of the group of messages is a unicast message that is a short-message service message.

15. The method as recited in claim 10, wherein transmitting the group of messages includes scrambling each message of the group of messages in accordance with the cell radio-network temporary-identifier.

16. The method as recited by claim 10, wherein negotiating the repeating time interval includes the base station transmitting, to the user equipment, time intervals associated with paging operations the base station intends to perform using a paging channel.

17. The method as recited in claim 10, wherein the transmitting, to the user equipment, a radio-resource control release message that includes a cell radio-network temporary-identifier, the radio-resource control release message comprises:
    transmitting, to the user equipment, a radio-resource control release message that includes a cell radio-network temporary-identifier, the radio-resource control release message causing the user equipment to enter an enhanced radio-resource control idle mode having discontinuous uplink and downlink communications with the base station.

18. A user equipment comprising:
    a processor and a computer-readable storage media comprising instructions to implement an enhanced radio-resource control idle mode manager application, the enhanced radio-resource control idle mode manager application configured to cause the user equipment to:

negotiate, with a base station, a repeating time interval for potential receipt of a message;

receive, from the base station, a radio-resource control release message that includes a cell radio-network temporary-identifier;

enter, responsive to receiving the radio-resource control release message, an enhanced radio-resource control idle mode having discontinuous downlink communications with the base station;

receive, while in the enhanced radio-resource control idle mode and from the base station, a message, the message received in accordance with the cell radio-network temporary-identifier and the negotiated repeating time interval; and present, while in the enhanced radio-resource control idle mode, the received message.

19. The user equipment as recited in claim 18, wherein the negotiated repeating time interval corresponds to intervals associated with pages received from the base station via a paging channel.

20. The user equipment as recited in claim 18, wherein the message is a unicast message that is a short-message service message.

21. The user equipment as recited in claim 18, wherein the received message is an encrypted message and the enhanced radio-resource control idle mode manager application is further configured to decrypt the message.

22. The user equipment as recited in claim 18, wherein the enhanced radio-resource control idle mode manager application is further configured to:

cause the user equipment to accumulate a group of messages; and transmit, to the base station, a group acknowledgment message.

23. The user equipment as recited in claim 18, wherein the enhanced radio-resource control idle mode manager application is further configured to:

cause the user equipment to negotiate the repeating time interval while the user equipment operates in a radio-resource control connected mode.

24. The user equipment of claim 18, wherein entering, responsive to receiving the radio-resource control release message, an enhanced radio-resource control idle mode further configures the enhanced radio-resource control idle mode manager application to:

enter, responsive to receiving the radio-resource control release message, an enhanced radio-resource control idle mode having discontinuous uplink and downlink communications with the base station.

* * * * *